United States Patent [19]

Bailey

[11] Patent Number: 5,331,956
[45] Date of Patent: Jul. 26, 1994

[54] AIRLINE SEAT SAFETY BLANKET

[76] Inventor: Mickey M. Bailey, P.O. Box 1641, Paradise, Calif. 95967

[21] Appl. No.: 889,270

[22] Filed: May 28, 1992

[51] Int. Cl.$^5$ .................. A61M 15/00; A62C 8/00; A47C 27/00
[52] U.S. Cl. .................. 128/202.13; 128/200.24; 297/184.1; 169/50
[58] Field of Search .................. 128/200.24, 204.18, 128/205.25, 206.21, 206.27, 202.13; 244/122 R; 297/184, 220, 219, 184; 169/50, 53

[56] References Cited

U.S. PATENT DOCUMENTS

| | | | |
|---|---|---|---|
| 3,828,856 | 8/1974 | Wallis | 169/50 |
| 4,320,922 | 3/1982 | Meritis | 297/220 |
| 4,650,002 | 3/1987 | Pierce, Jr. | 169/50 |
| 4,899,962 | 2/1990 | Mueller | 169/53 X |

FOREIGN PATENT DOCUMENTS

| | | | |
|---|---|---|---|
| 1214089 | 4/1966 | Fed. Rep. of Germany | 169/50 |
| 2058832 | 5/1971 | France | 169/49 |
| 2249264 | 5/1992 | United Kingdom | 169/50 |

Primary Examiner—Edgar S. Burr
Assistant Examiner—Eric P. Raciti
Attorney, Agent, or Firm—Leon Gilden

[57] ABSTRACT

An airline seat is arranged with a compartment formed at an upper end portion of the airline seat, with the compartment having an entrance door pivotally mounted relative to the compartment permitting access to handles and a blanket mounted within the compartment. The blanket is formed of a fire retardant material, with its first end anchored within the compartment and its second end including handles to permit displacement of the blanket for surrounding relationship relative to an occupant of the associated seat.

2 Claims, 4 Drawing Sheets

AIRLINE SEAT SAFETY BLANKET

BACKGROUND OF THE INVENTION

1. Field of the Invention

The field of invention relates to safety blanket structure, and more particularly pertains to a new and, improved airline seat safety blanket wherein the same is arranged to afford protection to an individual in the event of cabin fire within an associated airline passenger cabin.

2. Description of the Prior Art

Injury related to airline accident is availed of jet fuel and associated vapors igniting in association with an airline crash and the like. The instant invention attempts to afford each occupant of an airline seat protection by providing for a fire retardant blanket removably mounted relative to each seat to provide for a tent-like canopy structure to afford protection to each passenger in use of the organization. Fire retardant blanket structure of various types have been utilized in the prior art and are exemplified in the U.S. Pat. Nos. 4,624,320; 4,844,960; 3,828,856; 4,956,218; and 4,650,002.

Accordingly, it may be appreciated there continues to be a need for a new and improved airline seat safety blanket as set forth by the instant invention which addresses both the problems of ease of use as well as effectiveness in construction in affording protection to airline occupants in the event of cabin fire and in this respect, the present invention substantially fulfills this need.

SUMMARY OF THE INVENTION

In view of the foregoing disadvantages inherent in the known types of safety blanket structure now present in the prior art, the present invention provides an airline seat safety blanket wherein the same is arranged for manual displacement from an airline seat to afford canopy protection to an individual within the seat. As such, the general purpose of the present invention, which will be described subsequently in greater detail, is to provide a new and improved airline seat safety blanket which has all the advantages of the prior art safety blanket structure and none of the disadvantages.

To attain this, the present invention provides an airline seat arranged with a compartment formed at an upper end portion of the airline seat, with the compartment having an entrance door pivotally mounted relative to the compartment permitting access to handles and a blanket mounted within the compartment. The blanket is formed of a fire retardant material, with its first end anchored within the compartment and its second end including handles to permit displacement of the blanket for surrounding relationship relative to an occupant of the associated seat.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved airline seat safety blanket which has all the advantages of the prior art safety blanket structure and none of the disadvantages.

It is another object of the present invention to provide a new and improved airline seat safety blanket which may be easily and efficiently manufactured and marketed.

It is a further object of the present invention to provide a new and improved airline seat safety blanket which is of a durable and reliable construction.

An even further object of the present invention is to provide a new and improved airline seat safety blanket which is susceptible of a low cost of manufacture with regard to both materials and labor, and which accordingly is then susceptible of low prices of sale to the consuming public, thereby making such airline seat safety blankets economically available to the buying public.

Still yet another object of the present invention is to provide a new and improved airline seat safety blanket which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
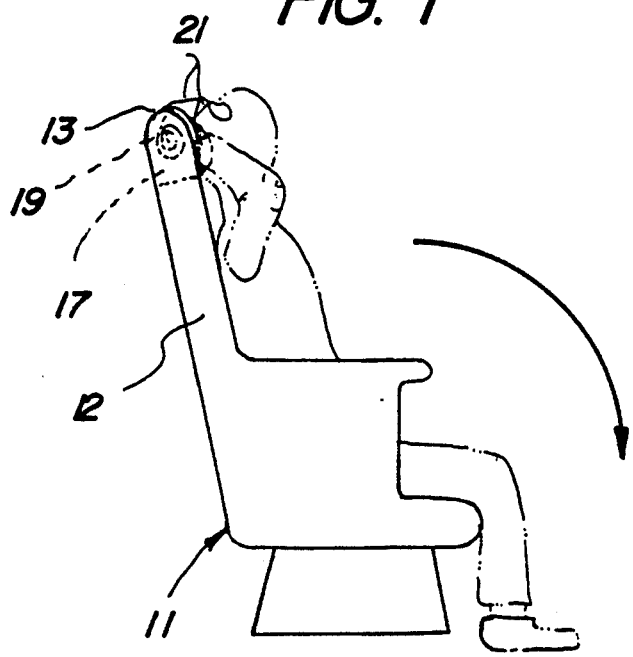
FIG. 1 is an orthographic side view of the instant invention prior to use.

With reference now to the drawings, and in particular to FIGS. 1 to 10 thereof, a new and improved airline seat safety blanket embodying the principles and concepts of the present invention and generally designated by the reference numeral 10 will be described.

Figure 2:
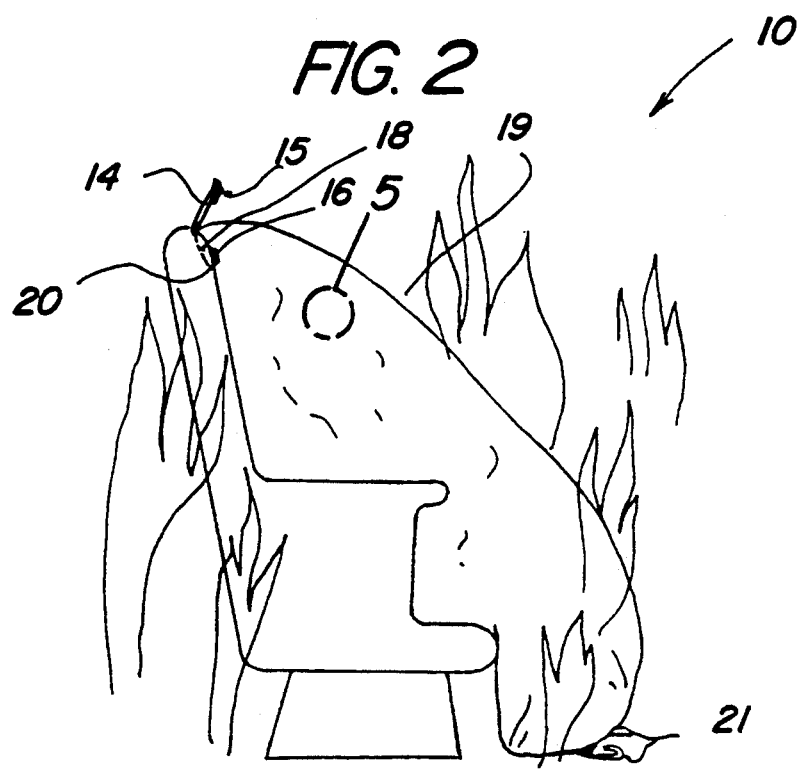
FIG. 2 is an orthographic side view of the invention extended from the associated airline seat.

More specifically, the airline seat safety blanket 10 of the instant invention essentially comprises an airline seat 11 having a seat back 12, with a seat back upper portion 13. A door flap 14 is pivotally mounted relative to the seat back upper portion 14 directed into a storage cavity 17. The door flap 14 includes a first hook and loop fastener strip 15 mounted thereon, with a second hook and loop fastener strip 16 mounted to a periphery of a cavity entrance 18 of the storage cavity 17. A blanket 19 is furled in a first position within the storage cavity 17 and arranged for extension to a second position directed from the storage cavity 17, in a manner as illustrated in FIG. 2, to the second position. The blanket 19 has a blanket first end 20 fixedly mounted and secured within the storage cavity 17 adjacent the entrance 18. A plurality of blanket handles 21 are mounted to a blanket second end 22 that is arranged in a spaced relationship relative to the first end 20. In this manner, an individual merely effects lifting of the door flap 14 and securement of the handles 21 to permit extension of the blanket relative to the seat 11. The blanket is formed of fire retardant material such as NOMEX commercially available.

Figure 3:
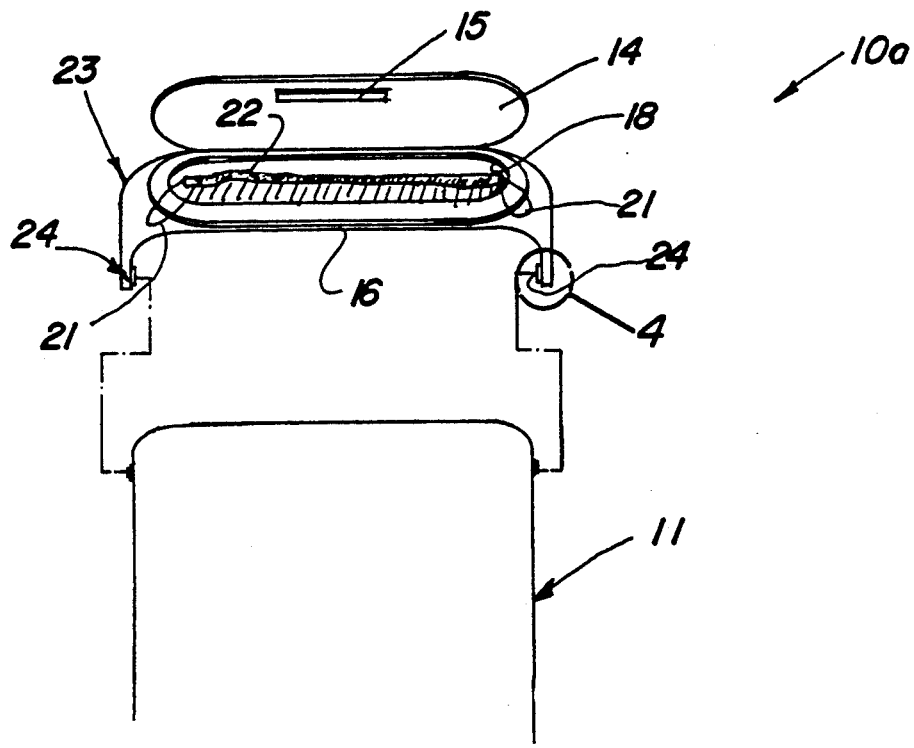
FIG. 3 is an orthographic view of the safety blanket structure mounted in a retrofit manner relative to an airline seat.
Figure 4:
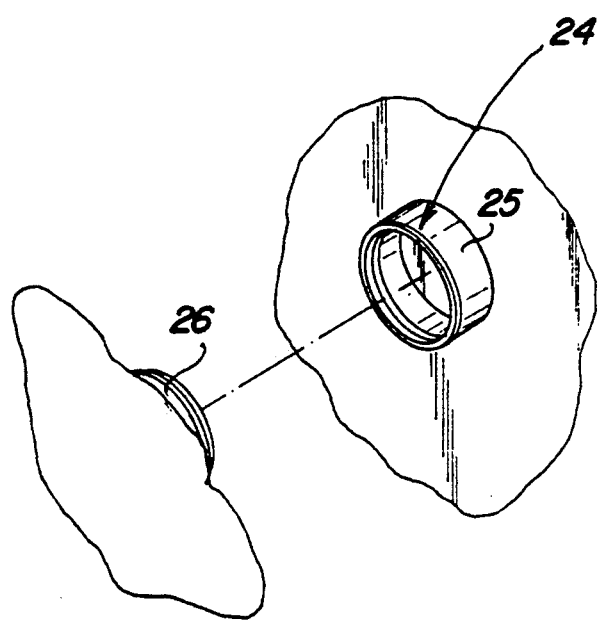
FIG. 4 is an isometric illustration of section 4 as set forth in FIG. 3.
Figure 5:
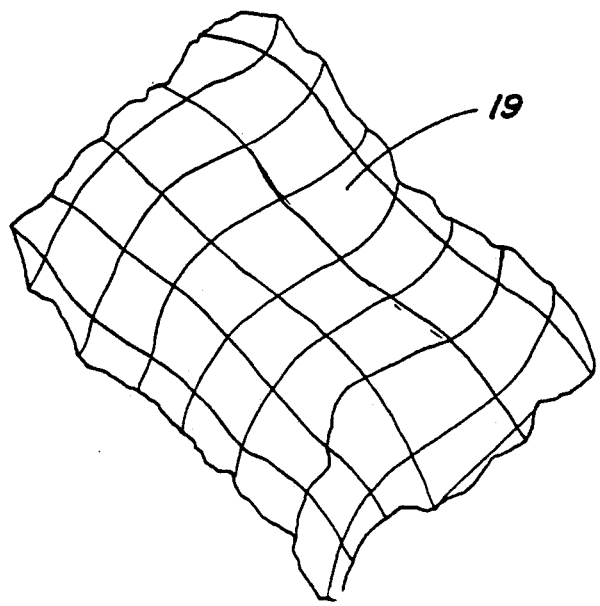
FIG. 5 is an isometric illustration of section 5 as set forth in FIG. 2.
Figure 6:
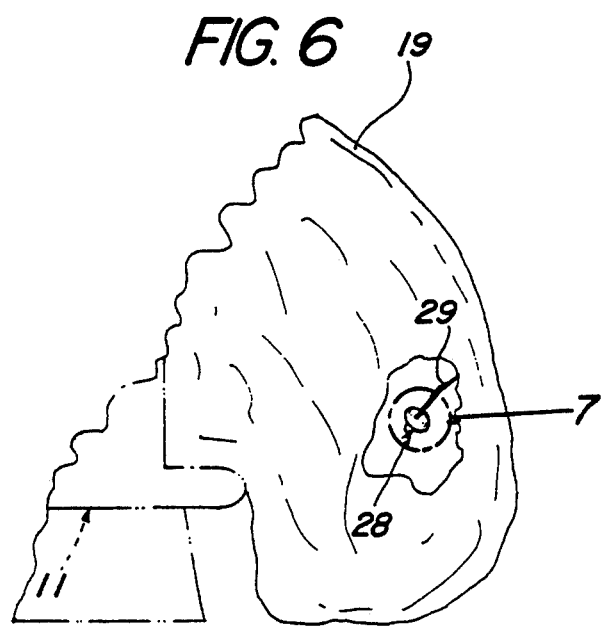
FIG. 6 is an orthographic view, partially in section, illustrating the use of a mouthpiece member utilized by the blanket structure.
Figure 7:
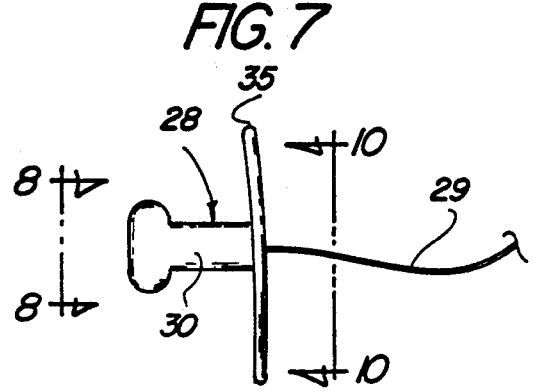
FIG. 7 is an orthographic view of section 7 as set forth in FIG. 6.
Figure 8:
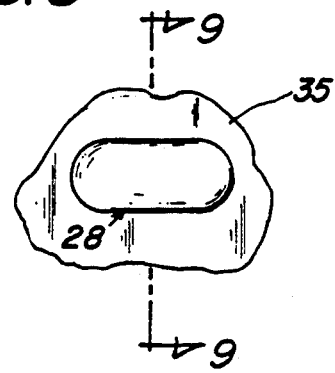
FIG. 8 is an orthographic view, taken along the lines 8—8 of FIG. 7 in the direction indicated by the arrows.
Figure 9:
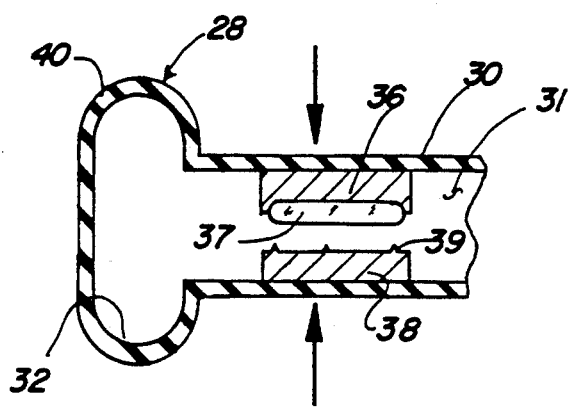
FIG. 9 is an orthographic view, taken along the lines 9—9 of FIG. 8 in the direction indicated by the arrows.
Figure 10:
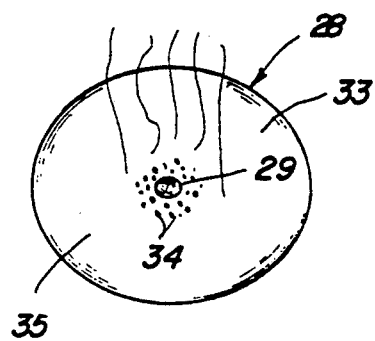
FIG. 10 is an orthographic view, taken along the lines 10—10 of FIG. 7 in the direction indicated by the arrows.

The FIG. 3 illustrates the use of an organization 10a having a blanket housing 23 arranged for retrofit relative to the upper portion of the seat 11. In this manner, snap fit fasteners 24 are mounted to opposed sides of the seat to accommodate securement to the seat structure. A fastener socket 26 is mounted to opposed sides of the seat, wherein each socket is arranged in coaxially aligned relationship to receive a fastener boss 27 at each end of the housing 23.

The FIGS. 6-10 illustrate the use of a mouthpiece having a tether line 29 securing the mouthpiece 28 to an interior surface of the blanket adjacent to but spaced from the second end of the blanket. The mouthpiece includes a resilient body having a body cavity 31, with the body secured to a mouthpiece head 40, also typically of a hollow configuration but may be filled with various foam and the like to effect cushioning of an individual's mouth. The mouthpiece structure includes a head cavity 32 to permit the use of various cushioning members and the like to be positioned as required within the body cavity 32 of mouthpiece head 40. The body cavity 31 includes a first block 36 arranged in confronting relationship relative to a second block 38. The first block 36 includes a frangible aromatic smelling salt capsule 37, typically including an ammonia saturated fiber and the like of conventional smelling salt construction. The frangible capsule is arranged in confronting relationship relative to second block projections 39 fixedly mounted to the second block 38, whereupon an individual affecting a biting and crushing of the capsule by directing the first block 36 to the second block 38 effects the directing of thusly released fumes from the capsule 37 to be directed through an abutment plate 35 mounted to a rear end of the body 30, and more specifically through apertures 34 through the abutment plate 35. In this manner, consciousness may be maintained upon impending impact and the like by an individual that effects a conscious or unconscious crushing of the capsule.

As to the manner of usage and operation of the instant invention, the same should be apparent from the above disclosure,. and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An airline seat safety blanket, comprising,
  a seat member, the seat member having a seat back, with the seat back including a seat back upper end portion, with a door flap pivotally mounted to the upper end portion, and
  a storage cavity mounted within the upper end portion below the door flap, and
  a flexible blanket formed of flame retardant material positioned within the storage cavity in a furled configuration in a first position arranged for extension to a second position overlying the seat extending from the storage cavity, the blanket having a first end spaced from a second end, the storage cavity including an entrance opening receiving the door flap, with the first end secured within the cavity adjacent the entrance, and
  the blanket second end including a plurality of handles, and
  the door flap includes a first fastener, and the storage cavity includes a second fastener cooperative with the first fastener, with the second fastener positioned at the entrance of the storage cavity, and
  the blanket includes a mouthpiece, the mouthpiece including a tether line, the tether line having a tether line first end secured to the mouthpiece, the tether line second end secured to the blanket adjacent to and spaced from the blanket second end.

2. An airline seat safety blanket as set forth in claim 1 wherein the mouthpiece includes a resilient body, the body including a head mounted to a forward end of the body, and the body including an abutment plate mounted to the body spaced from the head, and the body including a body cavity, the body cavity having a first block positioned therewithin, and a second block positioned therewithin adjacent to and in confronting relationship relative to the first block, the first block having a frangible, aromatic smelling salt capsule mounted thereon, and the second block including a plurality of projections arranged in confronting adjacency relative to the capsule to effect breaking of the capsule upon oral compression of the body.

* * * * *